(12) United States Patent  
Beste et al.

(10) Patent No.: US 7,410,586 B2
(45) Date of Patent: Aug. 12, 2008

(54) PURIFICATION OR WORK-UP ON IONIC LIQUIDS BY MEANS OF ADSORPTIVE SEPARATION PROCESSES

(75) Inventors: York Alexander Beste, Mannheim (DE); Jürgen Ciprian, Ludwigshafen (DE); Stephan Maurer, Böhl-Iggelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 146 days.

(21) Appl. No.: 10/806,198

(22) Filed: Mar. 23, 2004

(65) Prior Publication Data

US 2004/0188350 A1 Sep. 30, 2004

(30) Foreign Application Priority Data

Mar. 25, 2003 (DE) ............... 103 13 207

(51) Int. Cl.
*B01D 15/08* (2006.01)
(52) U.S. Cl. ............... 210/635; 210/634; 210/656; 210/659; 210/198.2; 203/41
(58) Field of Classification Search ............... 210/635, 210/656, 659, 198.2, 634; 203/41
See application file for complete search history.

(56) References Cited

U.S. PATENT DOCUMENTS

| | | | | |
|---|---|---|---|---|
| 4,402,832 | A * | 9/1983 | Gerhold | 210/659 |
| 4,751,291 | A * | 6/1988 | Thiem et al. | 536/18.6 |
| 5,543,474 | A * | 8/1996 | Kawaki et al. | 525/440 |
| 5,748,437 | A * | 5/1998 | Andelman | 361/302 |
| 6,468,495 | B1 * | 10/2002 | Fields et al. | 423/499.1 |
| 6,916,951 | B2 * | 7/2005 | Tustin et al. | 560/231 |
| 2002/0091281 | A1 | 7/2002 | Chauvin et al. | |
| 2004/0015009 | A1 * | 1/2004 | Earle et al. | 562/409 |
| 2005/0051438 | A1 * | 3/2005 | Pitner et al. | 205/413 |

FOREIGN PATENT DOCUMENTS

| | | |
|---|---|---|
| EP | 0 190 896 | 8/1986 |
| WO | WO 02/30862 | 4/2002 |
| WO | 02/074718 | 9/2002 |
| WO | WO 03/013685 | 2/2003 |
| WO | WO 03/037835 | 5/2003 |
| WO | WO 03/048078 | 6/2003 |
| WO | WO 03/051894 | 6/2003 |

OTHER PUBLICATIONS

Snyder, Introduction to Modern Liquid Chromatography, John Wiley & Sons New York, 1979, pp. 270-272, 285, and 410-411.*

Hackh's Chemical Dictionary, McGraw-Hill Book, New York, 1972, p. 461.*

Mikes' Laboratory Handbook of Chromatographic and Allied Methods, John Wiley & Sons New York, 1979, pp. 218-219.*

J.F. Brennecke; L.A. Blanchard: "Separation of species from Ionic liquids" ACS Symposium Series, Nr. 819, 2002, Seiten, XP008031714, pp. 83, 85 ,87, 89, 91 & 93 & 95 All even number pages missing.

(Continued)

*Primary Examiner*—Ernest G Therkorn
(74) *Attorney, Agent, or Firm*—Novak Druce + Quigg LLP

(57) ABSTRACT

Process for the work-up of a mixture comprising ionic liquids and a further substance, wherein the substance present is separated off by means of adsorptive separation processes.

17 Claims, 1 Drawing Sheet

OTHER PUBLICATIONS

Database WPI Section Ch, Week 198824, Derwent Publications Ltd., London, GB Class A13, AN 1988-166475, XP 002284550, abstract only.

Abstract of Japan 62 260496, Apr. 1, 1987.

Abstract of Japan 60 131092.

von Wasserscheid and Keim, Angewandte Chemie 2000, 112, 3926-3945.

Wasserscheid and Welton "Ionic liquids in synthesis" 2003 Wiley-Vch Verlag, Weinheim, pp. 17-19.

Ind. Chem. Res. (2001), 40(1), 287-292, Brennecke.

Y. Beste, "Simulierte Gegenstromchromatographie Fur Mehrkomponenten- und kinetisch kontrollierte Systeme", progress report VDI No. 712, Jun. 12, 2001.

"*Treatment of molten salt reprocessing wastes*" esp@cenet English language abstract of CN 1,269,767, a counterpart of document (A) Oct. 11, 2000.

"*Method and Apparatus for Ion Exchange Lead Removal*" esp@cenet English language abstract of CN 86/100,839, a counterpart of document (AA) Aug. 6, 1986.

\* cited by examiner

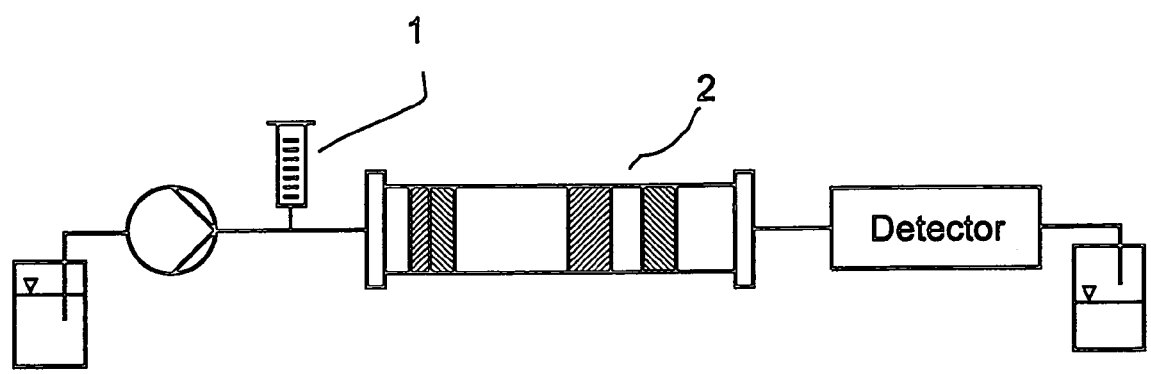

PURIFICATION OR WORK-UP ON IONIC LIQUIDS BY MEANS OF ADSORPTIVE SEPARATION PROCESSES

The present invention relates to an improved process for the purification or work-up of ionic liquids (ILs).

Ionic liquids are a class of substances which have been employed for only a relatively short time. They are relatively low-viscosity, relatively noncorrosive salt melts which are liquid at relatively low temperatures, usually less than 100° C., preferably at room temperature. A great deal of research on them is at present being carried out in universities and industry. There are initial commercial applications and it is to be expected that the number of applications will rise sharply in the future. A comprehensive description of ionic liquids is given, for example, by von Wasserscheid and Keim in Angewandte Chemie 2000, 112, 3926-3945.

For the purposes of the present invention, ionic liquids are compounds which have at least one positive charge and at least one negative charge but are electrically neutral overall and have a melting point below 200° C., preferably below 100° C., particularly preferably below 50° C.

The ionic liquids can also have a plurality of positive or negative charges, for example from 1 to 5, preferably from 1 to 4, particularly preferably from 1 to 3, very particularly preferably 1 or 2 but in particular only one positive charge and one negative charge.

The charges can be located in various localized or delocalized regions within one molecule, i.e. in a betaine-like fashion, or be distributed over separate ions and cations. Preference is given to ionic liquids made up of at least one cation and at least one anion. Cation and anion can, as indicated above, be singly or multiply charged, preferably singly charged.

Of course, mixtures of various ionic liquids are also conceivable.

As cation, preference is given to ammonium or phosphonium ions or cations comprising at least one five- or six-membered heterocycle containing at least one phosphorus or nitrogen atom and, if desired, an oxygen or sulfur atom, particularly preferably compounds comprising at least one five- or six-membered heterocycle containing one, two or three nitrogen atoms and one sulfur or oxygen atom, very particularly preferably ones having one or two nitrogen atoms.

Particularly preferred ionic liquids are ones which have a molecular weight of less than 1000 g/mol, very particularly preferably less than 350 g/mol.

Furthermore, preference is given to cations selected from among the compounds of the formulae (Ia) to (Iw),

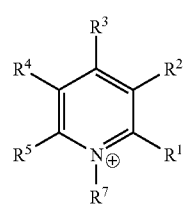
(a)

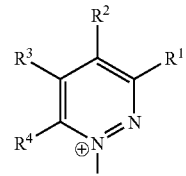
(b)

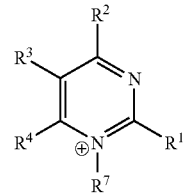
(c)

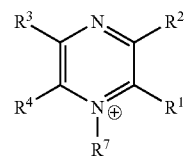
(d)

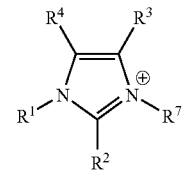
(e)

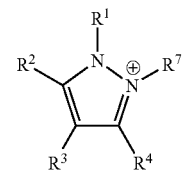
(f)

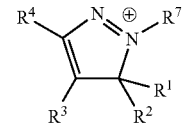
(g)

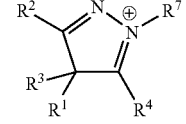
(h)

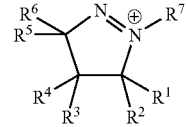
(i)

-continued (j) 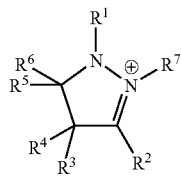

(k) 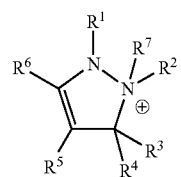

(l) 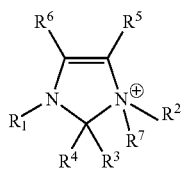

(m) 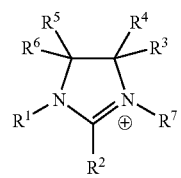

(n) 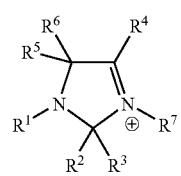

(o) 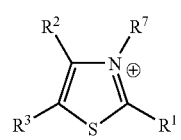

(p) 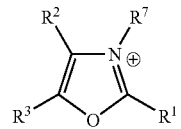

(q) 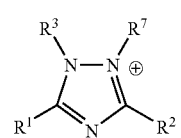

(r) 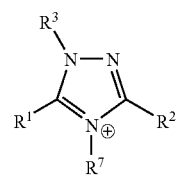

-continued (s) 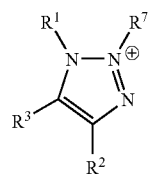

(t) 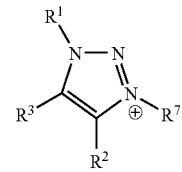

(u) 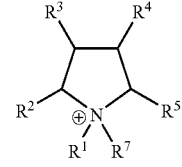

(v) 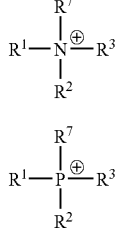

(w)

and oligomers and polymers in which these structures are present, where $R^1$, $R^2$, $R^3$, $R^4$, $R^5$, $R^6$ and $R^7$ are each, independently of one another, $C_1$-$C_{18}$-alkyl, $C_2$-$C_{18}$-alkyl interrupted by one or more oxygen and/or sulfur atoms and/or one or more substituted or unsubstituted imino groups, $C_6$-$C_{12}$-aryl, $C_5$-$C_{12}$-cycloalkyl or a five- or six-membered, oxygen-, nitrogen- and/or sulfur-containing heterocycle or two of them together form an unsaturated, saturated or aromatic ring which may be interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

In addition, $R^1$, $R^2$, $R^3$, $R^4$, $R^5$ and $R^6$ can be hydrogen.

$R^7$ can also be $C_1$-$C_{18}$-alkyloyl (alkylcarbonyl), $C_1$-$C_{18}$-alkyloxycarbonyl, $C_5$-$C_{12}$-cycloalkylcarbonyl or $C_6$-$C_{12}$-aryloyl (arylcarbonyl), where the radicals mentioned may each be substituted by functional groups, aryl, alkyl, aryloxy, alkyloxy, halogen, heteroatoms and/or heterocycles.

In these definitions $C_1$-$C_{18}$-alkyl which may be substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethyl-propyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl,1-(p-butylphenyl)ethyl, p-chlorobenzyl, 2,4- dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, 2-ethoxyethyl, 2-methoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxy-isopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-amino-hexyl, 2-methylaminoethyl, 2-methylaminopropyl, 3-methylaminopropyl, 4-methyl-aminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, and $C_2$-$C_{18}$-alkyl interrupted by one or more oxygen and/or sulfur atoms and/or one or more substituted or unsubstituted imino groups is, for example, 5-hydroxy-3-oxa-pentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8, 12-trioxapentadecyl, 9-hydroxy-5-oxanonyl, 14-hydroxy-5,10-oxatetradecyl, 5-methoxy-3-oxapentyl, 8-methoxy-3,6-dioxa-octyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, they can together be 1,3-propylene, 1,4-butylene, 2-oxa-1,3-propylene, 1-oxa-1,3-propylene, 2-oxa-1,3-propylene, 1-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of oxygen and/or sulfur atoms and/or imino groups is not subject to any restrictions. In general, there will be no more than 5 in the radical, preferably no more than 4 and very particularly preferably no more than 3.

Furthermore, there is generally at least one carbon atom, preferably at least two carbon atoms, between any two heteroatoms.

Substituted and unsubstituted imino groups can be, for example, imino, methylimino, isopropylimino, n-butylimino or tert-butylimino.

Furthermore, functional groups can be carboxy, carboxamide, hydroxy, di($C_1$-$C_4$-alkyl)amino, $C_1$-$C_4$-alkyloxycarbonyl, cyano or $C_1$-$C_4$-alkyloxy, $C_6$-$C_{12}$-aryl which may be substituted by functional groups, aryl, alkyl, aryloxy, alkyloxy, halogen, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which may be substituted by functional groups, aryl, alkyl, aryloxy, alkyloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, a five- or six-membered, oxygen-, nitrogen- and/or sulfur-containing heterocycle is, for example, furyl, thienyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthienyl, isopropylthienyl or tert-butylthienyl and $C_1$ to $C_4$-alkyl is, for example, methyl, ethyl, propyl, isopropyl, n-butyl, sec-butyl or tert-butyl.

$C_1$-$C_{18}$-Alkyloyl (alkylcarbonyl) can be, for example, acetyl, propionyl, n-butyloyl, sec-butyloyl, tert-butyloyl, 2-ethylhexylcarbonyl, decanoyl, dodecanoyl, chloroacetyl, trichloroacetyl or trifluoroacetyl.

$C_1$-$C_{18}$-Alkyloxycarbonyl can be, for example, methyloxycarbonyl, ethyloxycarbonyl, propyloxycarbonyl, isopropyloxycarbonyl, n-butyloxycarbonyl, sec-butyloxycarbonyl, tert-butyloxycarbonyl, hexyloxycarbonyl, 2-ethylhexyloxycarbonyl or benzyloxycarbonyl.

$C_5$-$C_{12}$-Cycloalkylcarbonyl can be, for example, cyclopentylcarbonyl, cyclohexyl-carbonyl or cyclododecylcarbonyl.

$C_6$-$C_{12}$-Aryloyl (arylcarbonyl) can be, for example, benzoyl, toluyl, xyloyl, α-naphthoyl, β-naphthoyl, chlorobenzoyl, dichlorobenzoyl, trichlorobenzoyl or trimethylbenzoyl.

Preference is given to $R^1$, $R^2$, $R^3$, $R^4$, $R^5$ and $R^6$ each being, independently of one another, hydrogen, methyl, ethyl, n-butyl, 2-hydroxyethyl, 2-cyanoethyl, 2-(methoxycarbonyl)ethyl, 2-(ethoxycarbonyl)ethyl, 2-(n-butoxycarbonyl)ethyl, dimethylamino, diethylamino or chlorine.

$R^7$ is preferably methyl, ethyl, n-butyl, 2-hydroxyethyl, 2-cyanoethyl, 2-(methoxy-carbonyl)ethyl, 2-(ethoxycarbonyl)ethyl, 2-(n-butoxycarbonyl)ethyl, acetyl, propionyl, t-butyryl, methoxycarbonyl, ethoxycarbonyl or n-butoxycarbonyl.

Particularly preferred pyridinium ions (Ia) are those in which one of the radicals $R^1$ to $R^5$ is methyl, ethyl or chlorine, $R^7$ is acetyl, methyl, ethyl or n-butyl and all others are hydrogen, or $R^3$ is dimethylamino, $R^7$ is acetyl, methyl, ethyl or n-butyl and all others are hydrogen or $R^7$ is acetyl, methyl, ethyl or n-butyl and all others are hydrogen or $R^2$ is carboxy or carboxamide, $R^7$ is acetyl, methyl, ethyl or n-butyl and all others are hydrogen or $R^1$ and $R^2$ or $R^2$ and $R^3$ are together 1,4-buta-1,3-dienylene, $R^7$ is acetyl, methyl, ethyl or n-butyl and all others are hydrogen.

Particularly preferred pyridazinium ions (Ib) are those in which one of the radicals $R^1$ to $R^4$ is methyl or ethyl, $R^7$ is acetyl, methyl, ethyl or n-butyl and all others are hydrogen or $R^7$ is acetyl, methyl, ethyl or n-butyl and all others are hydrogen.

Particularly preferred pyrimidinium ions (Ic) are those in which $R^2$ to $R^4$ are each hydrogen or methyl, $R^7$ is acetyl, methyl, ethyl or n-butyl and $R^1$ is hydrogen, methyl or ethyl, or $R^2$ and $R^4$ are each methyl, $R^3$ is hydrogen and $R^1$ is hydrogen, methyl or ethyl and $R^7$ is acetyl, methyl, ethyl or n-butyl.

Particularly preferred pyrazinium ions (Id) are those in which $R^1$ to $R^4$ are all methyl and
$R^7$ is acetyl, methyl, ethyl or n-butyl or $R^7$ is acetyl, methyl, ethyl or n-butyl and all others are hydrogen.

Particularly preferred imidazolium ions (Ie) are those in which, independently of one another,
$R^1$ is selected from among methyl, ethyl, n-propyl, n-butyl, n-pentyl, n-octyl, n-decyl, n-dodecyl, 2-hydroxyethyl and 2-cyanoethyl,
$R^7$ is acetyl, methyl, ethyl or n-butyl and
$R^2$ to $R^4$ are each, independently of one another, hydrogen, methyl or ethyl.

Particularly preferred 1H-pyrazolium ions (If) are those in which, independently of one another,
$R^1$ is selected from among hydrogen, methyl and ethyl,
$R^2$, $R^3$ and $R^4$ are selected from among hydrogen and methyl and
$R^7$ is selected from among acetyl, methyl, ethyl and n-butyl.

Particularly preferred 3H-pyrazolium ions (Ig) are those in which, independently of one another,
$R^1$ is selected from among hydrogen, methyl and ethyl,
$R^2$, $R^3$ and $R^4$ are selected from among hydrogen and methyl and
$R^7$ is selected from among acetyl, methyl, ethyl and n-butyl.

Particularly preferred 4H-pyrazolium ions (Ih) are those in which, independently of one another,
$R^1$ to $R^4$ are selected from among hydrogen and methyl and $R^7$ is selected from among acetyl, methyl, ethyl and n-butyl.

Particularly preferred 1-pyrazolinium ions (Ii) are those in which, independently of one another,
$R^1$ to $R^6$ are selected from among hydrogen and methyl and
$R^7$ is selected from among acetyl, methyl, ethyl and n-butyl.

Particularly preferred 2-pyrazolinium ions (Ij) are those in which, independently of one another,
$R^1$ is selected from among hydrogen, methyl, ethyl and phenyl,
$R^7$ is selected from among acetyl, methyl, ethyl and n-butyl and
$R^2$ to $R^6$ are selected from among hydrogen and methyl.

Particularly preferred 3-pyrazolinium ions (Ik) are those in which, independently of one another,
$R^1$ and $R^2$ are selected from among hydrogen, methyl, ethyl and phenyl,
$R^7$ is selected from among acetyl, methyl, ethyl and n-butyl and
$R^3$ to $R^6$ are selected from among hydrogen and methyl.

Particularly preferred imidazolinium ions (Il) are those in which, independently of one another,
$R^1$ and $R^2$ are selected from among hydrogen, methyl, ethyl, n-butyl and phenyl,
$R^7$ is selected from among acetyl, methyl, ethyl and n-butyl and
$R^3$ and $R^4$ are selected from among hydrogen, methyl and ethyl and
$R^5$ and $R^6$ are selected from among hydrogen and methyl.

Particularly preferred imidazolinium ions (Im) are those in which, independently of one another,
$R^1$ and $R^2$ are selected from among hydrogen, methyl and ethyl,
$R^7$ is selected from among acetyl, methyl, ethyl and n-butyl and
$R^3$ to $R^5$ are selected from among hydrogen and methyl.

Particularly preferred imidazolinium ions (In) are those in which, independently of one another,
$R^1$, $R^2$ and $R^3$ are selected from among hydrogen, methyl and ethyl,
$R^7$ is selected from among acetyl, methyl, ethyl and n-butyl and
$R^4$ to $R^6$ are selected from among hydrogen and methyl.

Particularly preferred thiazolium ions (Io) or oxazolium ions (Ip) are those in which, independently of one another,
$R^1$ is selected from among hydrogen, methyl, ethyl and phenyl,
$R^7$ is selected from among acetyl, methyl, ethyl and n-butyl and
$R^2$ and $R^3$ are selected from among hydrogen and methyl.

Particularly preferred 1,2,4-triazolium ions (Iq) and (Ir) are those in which, independently of one another,
$R^1$ and $R^2$ are selected from among hydrogen, methyl, ethyl and phenyl,
$R^7$ is selected from among acetyl, methyl, ethyl and n-butyl and
$R^3$ is selected from among hydrogen, methyl and phenyl.

Particularly preferred 1,2,3-triazolium ions (Is) and (It) are those in which, independently of one another,
$R^1$ is selected from among hydrogen, methyl and ethyl,
$R^7$ is selected from among acetyl, methyl, ethyl and n-butyl and
$R^2$ and $R^3$ are selected from among hydrogen and methyl or $R^2$ and $R^3$ are together 1,4-buta-1,3-dienylene and all others are hydrogen.

Particularly preferred pyrrolidinium ions (Iu) are those in which, independently of one another,
$R^1$ and $R^7$ are selected from among acetyl, methyl, ethyl and n-butyl and $R^2$, $R^3$, $R^4$ and $R^5$ are each hydrogen.

Particularly preferred ammonium ions (Iv) are those in which, independently of one another,
$R^7$ is selected from among acetyl, methyl, ethyl and n-butyl and
$R^1$, $R^2$ and $R^3$ are selected from among methyl, ethyl, n-butyl, 2-hydroxyethyl, benzyl and phenyl.

Particularly preferred phosphonium ions (Iw) are those in which, independently of one another,
$R^7$ is selected from among acetyl, methyl, ethyl and n-butyl and
$R^1$, $R^2$ and $R^3$ are selected from among phenyl, phenoxy, ethoxy and n-butoxy.

Among these, preference is given to the ammonium, phosphonium, pyridinium and imidazolium ions.

Very particularly preferred cations are 1,2-dimethylpyridinium, 1-methyl-2-ethyl-pyridinium, 1-methyl-2-ethyl-6-methylpyridinium, N-methylpyridinium, 1-butyl-2-methyl-pyridinium, 1-butyl-2-ethylpyridinium, 1-butyl-2-ethyl-6-methylpyridinium, N-butyl-pyridinium, 1-butyl-4-methylpyridinium, 1,3-dimethylimidazolium, 1,2,3-trimethyl-imidazolium, 1-n-butyl-3-methylimidazolium, 1,3,4,5-tetramethylimidazolium, 1,3,4-tri-methylimidazolium, 2,3-dimethylimidazolium, 1-butyl-2,3-dimethylimidazolium, 3,4-di-methylimidazolium, 2-ethyl-3,4-dimethylimidazolium, 3-methyl-2-ethylimidazole, 3-butyl-1-methylimidazolium, 3-butyl-1-ethylimidazolium, 3-butyl-1,2-dimethylimidazolium, 1,3-di-n-butylimidazolium, 3-butyl-1,4,5-trimethylimidazolium, 3-butyl-1,4-dimethylimidazolium, 3-butyl-2-methylimidazolium, 1,3-dibutyl-2-methylimidazolium, 3-butyl-4-methylimidazolium, 3-butyl-2-ethyl-4-methylimidazolium and 3-butyl-2-ethylimidazolium, 1-methyl-3-octylimidazolium, 1-decyl-3-methylimidazolium.

Especial preference is given to 1-butyl-4-methylpyridinium, 1-n-butyl-3-methyl-imidazolium and 1-n-butyl-3-ethylimidazolium.

Anions can in principle be any anions.

Preferred anions are halides, $F^-$, $Cl^-$, $Br^-$, $I^-$, acetate $CH_3COO^-$, trifluoroacetate $CF_3COO^-$, triflate $CF_3SO_3^-$, sulfate $SO_4^{2-}$, hydrogensulfate $HSO_4^-$, methylsulfate $CH_3OSO_3^-$, ethylsulfate $C_2H_5OSO_3^-$, sulfite $SO_3^{2-}$, hydrogensulfite $HSO_3^-$, chloroaluminates $AlCl_4^-$, $Al_2Cl_7^-$, $Al_3Cl_{10}^-$, tetrabromoaluminate $AlBr_4^-$, nitrite $NO_2^-$, nitrate $NO_3^-$, chlorocuprate $CuCl_2^-$, phosphate $PO_4^{3-}$, hydrogenphosphate $HPO_4^{2-}$, dihydrogenphosphate $H_2PO_4^-$, carbonate $CO_3^{2-}$, hydrogencarbonate $HCO_3^-$.

Ionic liquids can be used for improving the conversion and/or selectivity in reactions. Here, they either act as catalysts themselves or as suitable solvents. A further large field of application is the use of ionic liquids as auxiliaries in separation operations. Here, they can be used in distillation (extractive distillation), in extraction, absorption or membrane processes. WO 02/074718 discloses the use of ionic liquids as additives for the separation of narrow-boiling or azeotropic mixtures. They can also be used as heat transfer media or electrolytes for batteries. Each of these uses leads either to dilution or contamination of the ionic liquid, so that it either has to be worked up or disposed of. Up to the present, the preparation of ionic liquids has been relatively expensive (about 1000 €/kg) because of the small quantities. In the case of large capacities, costs of about 20-10 €/kg are possible. Owing to these still relatively high materials costs, it is desirable and essential for the economics of a process for the ionic liquid to be able to be used for as long as possible and be able to be recycled. This is normally achieved by means of recycled streams in a process. Impurities, in particular high-boiling impurities, accumulate in these recycled streams. This is countered by means of a purge stream which prevents or at least reduces the increase in the concentrations. The contaminated ionic liquid which is discharged has a considerable value and efforts are made to recover it.

The separation of low-boiling components from ionic liquids is usually relatively simple, since the ionic liquids have a nonmeasurable vapor pressure. The low-boiling components are separated off by simple evaporation or rectification.

However, the separation of high-boiling impurities from the ionic liquids is found to be a problem. Here, high boilers are substances which are difficult to separate off from an ionic liquid by distillation. These can be polymers which have no measurable vapor pressure or substances which have only a low vapor pressure of less than about 10 mbar, preferably less than 1 mbar, at room temperature. They can also be substances which have a particularly strong interaction with ionic liquids, so that they can be removed only incompletely from the ionic liquid. Economical purification of the ionic liquid by vaporization is not possible in this case.

The separation of ionic liquids from other substances by means of extraction is known. It is employed, for example, after the synthesis of ionic liquids and is described in Wasserscheid and Welton "Ionic liquids in synthesis" 2003 WILEY-VCH Verlag, Weinheim (page 17). Disadvantages are that it is frequently not possible to find a suitable solvent and a considerable amount of ionic liquid is lost during the separation, since it likewise dissolves in the extractant because of small miscibility gaps. Extraction is therefore suitable mainly for nonpolar high boilers which readily dissolve in nonpolar (organic) solvents. These solvents are virtually immiscible with most ionic liquids and can therefore often be separated off relatively easily. However, it is possible that the interfering impurity cannot be washed out of the IL. This is observed especially in the case of polar high boilers. In such a case, it is necessary to use polar solvents which have a greater miscibility with the ionic liquid, which then increases the undesirable loss of material of value (ionic liquid).

In Ind. Eng. Chem. Res. (2001), 40(1), 287-292, Prof. Brennecke describes the purification of ionic liquids using supercritical $CO_2$ as an alternative method. However, this procedure is relatively complicated in engineering terms.

It is an object of the present invention to find an alternative process for the purification of mixtures comprising ionic liquids, which remedies the abovementioned disadvantages and makes it possible to achieve an economical separation which is simple in process engineering terms.

We have found that this objective is achieved by a process for the work-up of a mixture comprising ionic liquids and a further substance, wherein the substance present is separated off by means of adsorptive separation processes.

Adsorptive separation techniques are found to be economical variants which are simple in process engineering terms for achieving the separation in the process of the present invention. Adsorptive separation techniques generally involve bringing the ionic liquid into contact with a solid (the adsorbent) so that impurities are concentrated on the surface of the adsorbent. In this way, the amount of impurities can be reduced or the impurities can be separated off completely from the ionic liquid. Adsorptive separation processes which are particularly suitable for the process of the present invention are chromatography, adsorption and ion exchange, which are described in more detail below.

BRIEF DESCRIPTION OF THE DRAWINGS

FIG. 1 shows adsorbing impurities and ionic liquid on a chromatography column.

DESCRIPTION OF THE PREFERRED EMBODIMENTS

Chromatography

The process is shown by way of example in FIG. 1. Here, the contaminated ionic liquid is injected into a continuously flowing solvent stream by means of a syringe (1) and transported to the chromatographic column (2). There, the ionic liquid and the impurities are adsorbed on the stationary phase (adsorbent). Solvent and adsorbent are selected by a person skilled in the art by means of routine experiments so that the strength of adsorption of ionic liquid and of impurity are different. This leads to different migration rates of the various substances through the column. If the column is long enough and the separation factor is sufficiently great, baseline separation takes place, so that the components can be separated from one another by switching of valves and are present alone in the solvent.

After the chromatographic separation, the solvent is separated from the ionic liquid. This can be achieved by known separation operations such as evaporation or crystallization.

Suitable stationary phases have been found to be, for example, silica gels, reversed phase silica gels, molecular sieves, zeolites, aluminum oxides, acid and base ion exchangers. The solvent should be miscible with the ionic liquid. Suitable solvents are, in particular, relatively polar solvents such as water, acetone, methanol, ethanol, propanol, acetonitrile and mixtures thereof.

Apart from the batchwise chromatography described here, it is also possible to use continuous chromatographic separation methods, e.g. simulated countercurrent chromatography.

This is a chromatographic process in which the ionic liquid to be purified is no longer added discontinuously via a syringe, but is introduced continuously. The purified ionic liquid and the impurities are likewise removed continuously from the apparatus. The way in which such a plant functions is prior art and is described, for example, in Y. Beste, "Simulierte Gegenstromchromatographie für Mehrkomponenten-und kinetisch kontrollierte Systeme", progress report VDI No. 712. Suitable adsorbents and solvents are the same materials as those mentioned above.

Adsorption or Ion Exchange

In contrast to chromatography, this advantageously requires no solvent which comes into contact with the ionic liquid and sometimes no separation from the solvent by means of an evaporation step is necessary either. In the case of adsorption or ion exchange, the ionic liquid contaminated with the additional substance is passed directly through a column containing either an adsorbent (in the form of powder in the column) or an ion exchange resin. Preferred adsorbents are adsorbent resins, activated carbon, zeolites, aluminum oxides, molecular sieves or silica gels and also reversed phase silica gels. In the case of the adsorbent, the impurities are adsorbed on the stationary phase (adsorbent) or, in the case of ion exchange, the impurities are bound to the ion exchange resin by electrical interactions. The ionic liquid leaves the column in purified form.

The stationary phase can be disposed of after a single use, but it is preferably passed to purification and reuse. For this purpose, the stationary phase is regenerated with a suitable regenerating medium such as steam, solvents, acids or alkalis (at ambient temperature or higher). It is then merely necessary to dispose of the regenerating medium and the impurities present therein.

Absorption and ion exchange can be carried out batchwise (i.e. a fixed bed goes through all of the individual steps in succession), pseudocontinuously, (i.e. two fixed beds are operated alternately) or fully continuously (carousel arrangements having 16-32 columns and a multiport valve).

The stationary phase can be present as a fixed bed, a suspended bed or a fluidized bed.

The process of the present invention offers an economical way which is simple in process engineering terms of separating off ionic liquids in pure form from mixtures. It is thus possible to work up the mixtures comprising ionic liquids obtained in many processes in an appropriate fashion and to reintroduce the purified ionic liquid into the respective process. As a result, the consumption of ionic liquid is decreased considerably and the waste streams obtained are minimized, which leads not only to simplification of the process but also to an improvement in the economics. The process of the present invention is particularly useful for separating off high-boiling components which frequently impart a color and/or impair the properties of the ionic liquid and/or have other adverse effects.

EXAMPLES

Example 1

Shaking Experiments

The ionic liquid (IL) used was 1-methylimidazolium hydrogensulfate. It is virtually colorless. After having been used a number of times, the IL was contaminated. Firstly, it had become darker, a phenomenon which is regularly observed when an IL is used at elevated temperatures. In addition, an intense dark green color developed during distillation. All volatile components could be removed by evaporation on a rotary evaporator. This barely changed the color. It became more concentrated. XRF analysis of the contaminated IL indicated relatively large amounts of S. In addition, Al, Cr, Mg, Fe, Ni, Cu were detected (<1000 ppm).

In the shaking experiment, 25 ml of this contaminated IL were in each case brought into contact with one of a variety of adsorbents for 24 hours. The liquid was then filtered. Comparison of the filtrates with the starting sample indicated a significant lightening of the color and thus a clearly visible purifying effect in all cases. Silica gels, adsorbent resins, ion exchangers, activated carbons and aluminum oxides were tested. The purifying effect was somewhat less in the case of aluminum oxide and better in the case of ion exchangers and adsorbent resins. The behavior of activated carbons was in the middle. The purifying effect was quantified by means of the discoloration. The less green the ionic liquid, the better the purifying effect.

Example 2

Column Experiments

A 1×25 cm column which was charged with adsorbent resin (polystyrene-divinylbenzene copolymer) as stationary phase was used. Deionized water as eluant was pumped continuously through the resin-containing column. Detection at the outlet of the column was carried out by means of a UV-VIS detector. To improve the fluidity, the contaminated IL was diluted with water prior to injection. Repeated injection of up to 200 μl of the IL into the resin gave in each case a symmetrical peak at 220 nm and no detectable peak at 430 nm. On injection into the system without a column, peaks were detected at both wavelengths. This indicates that the color-imparting substances were adsorbed on the resin.

After injection, water was replaced by isopropanol as solvent. A large peak clearly visible at 430 nm was observed in front of the isopropanol front, which demonstrates that the color-imparting substances were being desorbed. Similar desorption from the column was also able to be achieved using other solvents which are less polar than water. Successful desorption experiments were carried out using, for example, ethanol and methanol.

Comparative Example

An extraction experiment was carried out using the same starting solution of the contaminated ionic liquid. For this purpose, 25 g of ionic liquid were mixed with 25 g of n-hexane and stirred at ambient temperature for a number of hours. After mixing was stopped, the two phases separated again. The upper phase (n-hexane) remained clear and colorless and the lower phase (ionic liquid) was also unchanged. Thus, no purification took place.

We claim:

1. A process for purifying a mixture of at least one ionic liquid and at least one impurity,
   wherein the at least one impurity is a substance having a vapor pressure in the mixture that prohibits complete removal of the substance from the mixture by distillation, and/or
   wherein the at least one impurity is a substance that interacts with the at least one ionic liquid so as to prohibit complete removal of the substance from the mixture by distillation, said process comprising removing the at least one impurity from the mixture by continuous chromatographic process, and obtaining the resultant at least one ionic liquid.

2. A process as claimed in claim 1, wherein the separation is carried out by means of ion exchange.

3. A process as claimed in claim 1, wherein water, methanol, ethanol, 1-propanol or isopropanol or a mixture thereof is used as solvent.

4. A process as claimed in claim 1, wherein reversed phase silica gels, resins, ion exchangers, zeolites, aluminum oxides or activated carbon are used as stationary phases.

5. A process according to claim, wherein the at least one impurity is a polar compound.

6. A process according to claim 1, wherein the at least one impurity is a substance having a vapor pressure of less than about 10 mbar in the mixture at room temperature.

7. A process according to claim 1, wherein the at least one impurity is a substance having a vapor pressure of less than 1 mbar in the mixture at room temperature.

8. A process according to claim 1, wherein the at least one impurity is a polymer that has no measurable vapor pressure in the mixture at room temperature.

9. An adsorption separation process for removing an impurity from a mixture comprising an ionic liquid and the impurity,
   wherein the impurity is a substance having a vapor pressure in the mixture that prohibits complete removal of the substance from the mixture by distillation, and/or
   wherein the impurity is a substance that interacts with the ionic liquid so as to prohibit complete removal of the substance from the mixture by distillation,
   wherein the ionic liquid has an anion and cation, the cation comprising at least one five- or six-membered heterocycle containing at least one phosphorus or nitrogen atom; and
   wherein the process comprises a first step of contacting the contaminated ionic liquid with a resin, and a second step of separating the purified ionic liquid from the resin.

10. The separation process of claim 9, wherein the resin is at least one of an ion exchange resin and an adsorption resin.

11. The separation process of claim 9, wherein the separation is carried out by chromatography.

12. The separation process of claim 9, further comprising a step of removing low boiling compounds by evaporation.

13. The separation process of claim 9, wherein water, methanol, ethanol, 1-propanol, isopropanol or a mixture thereof is used as solvent.

14. The separation process of claim 9, wherein the anion is a halide.

15. A process as claimed in claim 9, wherein the impurity is a substance having a vapor pressure of less than about 10 mbar in the mixture at room temperature.

16. An adsorption separation process for removing at least one impurity from a contaminated ionic liquid,
   wherein the at least one impurity is a substance having a vapor pressure in a mixture comprising the at least one impurity and the at least one ionic liquid that prohibits complete removal of the substance from the mixture by distillation, and/or
   wherein the at least one impurity is a substance that interacts with the at least one ionic liquid in a mixture comprising the at least one impurity and the at least one ionic liquid so as to prohibit complete removal of the substance from the mixture by distillation,
   which process comprises
   providing the contaminated ionic liquid by
      (a) by separating volatile components from a mixture comprising the ionic liquid, the volatile components and the at least one impurity, by means of evaporation or rectification, and/or
      (b) separating non-polar components from a mixture comprising the ionic liquid, said the non-polar components and the at least one impurity, by means of extraction with a non-polar organic solvent,
   removing the at least one impurity from the contaminated ionic liquid by adsorptive separation, and
   obtaining the resultant at least one ionic liquid.

17. A process as claimed in claim 16, wherein the at least one impurity has a vapor pressure of less than about 10 mbar at room temperature in a mixture comprising the at least one impurity and the at least one ionic liquid.

* * * * *

UNITED STATES PATENT AND TRADEMARK OFFICE
CERTIFICATE OF CORRECTION

PATENT NO. : 7,410,586 B2  
APPLICATION NO. : 10/806198  
DATED : August 12, 2008  
INVENTOR(S) : Beste et al.

Page 1 of 1

It is certified that error appears in the above-identified patent and that said Letters Patent is hereby corrected as shown below:

On the cover page, item (54) line 1:
 "work-up on ionic" should read --work-up of ionic--

In Claim 5, col. 13, indicated line 12:
 "claim, wherein" should read --claim 1, wherein--

In Claim 16, col. 14, indicated line 26:
 "(a) by separating" should read --(a) separating--

Signed and Sealed this

Twenty-third Day of September, 2008

JON W. DUDAS  
*Director of the United States Patent and Trademark Office*

UNITED STATES PATENT AND TRADEMARK OFFICE
CERTIFICATE OF CORRECTION

PATENT NO. : 7,410,586 B2  
APPLICATION NO. : 10/806198  
DATED : August 12, 2008  
INVENTOR(S) : Beste et al.

Page 1 of 1

It is certified that error appears in the above-identified patent and that said Letters Patent is hereby corrected as shown below:

On the cover page, item (54) line 1 and Column 1, line 1:
"work-up on ionic" should read --work-up of ionic--

In Claim 5, col. 13, indicated line 12:
"claim, wherein" should read --claim 1, wherein--

In Claim 16, col. 14, indicated line 26:
"(a) by separating" should read --(a) separating--

This certificate supersedes the Certificate of Correction issued September 23, 2008.

Signed and Sealed this

Fourteenth Day of October, 2008

JON W. DUDAS  
*Director of the United States Patent and Trademark Office*